US008746013B2

(12) United States Patent
Geremew et al.

(10) Patent No.: US 8,746,013 B2
(45) Date of Patent: Jun. 10, 2014

(54) THREE DIMENSIONAL MICRO-FABRICATED BURNERS (75) Inventors: Muluwork Geremew, Columbia, MD (US); Daniel Warren Hawtof, Corning, NY (US); Richard Curwood Peterson, Elmira Heights, NY (US); Amy Lu Rovelstad, Ithaca, NY (US); Christopher Clark Thompson, Corning, NY (US)

(73) Assignee: Corning Incorporated, Corning, NY (US)

( * ) Notice: Subject to any disclaimer, the term of this patent is extended or adjusted under 35 U.S.C. 154(b) by 1108 days.

(21) Appl. No.: 12/593,010

(22) PCT Filed: Mar. 25, 2008

(86) PCT No.: PCT/US2008/003879
§ 371 (c)(1),
(2), (4) Date: Feb. 17, 2010

(87) PCT Pub. No.: WO2008/121271
PCT Pub. Date: Oct. 9, 2008

(65) Prior Publication Data
US 2010/0143601 A1 Jun. 10, 2010

Related U.S. Application Data (60) Provisional application No. 60/921,176, filed on Mar. 30, 2007.

(51) Int. Cl.
*C03B 37/014* (2006.01)
*C03B 37/018* (2006.01)

(52) U.S. Cl.
USPC ............... 65/531; 65/413; 65/421; 431/354

(58) Field of Classification Search
None
See application file for complete search history.

(56) References Cited

U.S. PATENT DOCUMENTS 4,786,342 A * 11/1988 Zellner et al. ............... 156/89.19
6,245,185 B1 * 6/2001 Bezama et al. ............... 156/252
6,736,633 B1 5/2004 Dawson-Elli et al.
(Continued)

FOREIGN PATENT DOCUMENTS

JP  11129640       5/1999
JP  2000515417 A * 11/2000
(Continued)

OTHER PUBLICATIONS

Bavarian Photonics, "Application Report: DPSSL Rapid Prototyping", 2004.*
(Continued)

*Primary Examiner* — Matthew Daniels
*Assistant Examiner* — Lisa Herring
(74) *Attorney, Agent, or Firm* — Robert P. Santandrea (57) ABSTRACT The invention relates to a burner module having a body that is either sintered or photo-cured, and to methods of making such a burner module. The body (110) of the burner (100) is formed from one of a sintered metal, a sintered alloy, a laminated glass ceramic, and a photo-cured polymer. 1 Sintering and photo-curing may be accomplished by irradiating the body with localized heating using a focused energy source, such as a laser. The burner module is resistant to thermal shock and provides a distributed, even stream of a precursor or precursors to be reacted in a flame of the burner module to form soot, which is to deposited on a receptor surface, and may be used for vapor and liquid precursor delivery systems. A soot deposition system having an array of such burner modules and methods of making a fused silica article by depositing soot using the burner modules are also described.

11 Claims, 11 Drawing Sheets

(56) References Cited

U.S. PATENT DOCUMENTS

| | | |
|---|---|---|
| 6,743,011 B2 | 6/2004 | Bakshi et al. |
| 6,837,076 B2 | 1/2005 | Hawtof |
| 2003/0167796 A1* | 9/2003 | Hawtof .................... 65/17.4 |
| 2005/0015046 A1* | 1/2005 | Weber et al. ............ 604/96.01 |
| 2006/0231975 A1* | 10/2006 | Teulet ..................... 264/225 |
| 2007/0130995 A1 | 6/2007 | Hawtof et al. |

FOREIGN PATENT DOCUMENTS

| | | |
|---|---|---|
| JP | 2001-201500 | 7/2001 |
| JP | 2001-522296 | 11/2001 |
| WO | 02/28790 | 4/2002 |
| WO | 2005/002833 | 1/2005 |
| WO | 2008/121271 | 10/2008 |

OTHER PUBLICATIONS

Anh et al., "Plastic Mesocombustors", Joint Meeting of the U.S. Sections of the Combustion Institute, Mar. 2005, pp. 1-4.*

Japanese Patent Office; Office Action; Issue Date: Dec. 18, 2012; pp. 1-5.

* cited by examiner

THREE DIMENSIONAL MICRO-FABRICATED BURNERS

CROSS REFERENCE TO RELATED APPLICATIONS

This application claims the benefit of U.S. Provisional Application No. 60/921,176, filed Mar. 30, 2007.

BACKGROUND

The invention relates to burner devices. More particularly, the invention relates to a burner module for producing an inorganic soot.

The formation of inorganic soot, particularly metallic oxide soot, produced by reacting a precursor in the flame of a burner is well known. Soot generated by such a reaction has been used to form articles such as, for example, crucibles, tubing, lenses, and optical waveguides by depositing the soot on a receptor surface.

The formation process for such articles from inorganic soot generally involves delivering a silicon-containing precursor to a burner and reacting the precursor in a burner flame generated by a combustible gas, such as a mixture of methane and oxygen. Historically, halide-containing precursors, such as silicon tetrachloride and mixtures of silicon tetrachloride with various dopants, have been used for producing preforms by vapor phase deposition techniques such as, for example, VAD (vapor axial deposition) and OVD (outside vapor deposition).

In these procedures, typically a vapor delivery process is utilized in which halide-containing raw materials are vaporized at a location remote from the burner. The vaporized raw materials are then transported to the burner by a carrier gas where they are volatilized and hydrolyzed to produce soot particles which are collected on a receptor surface.

Among the burner modules that are currently being used to generate soot in these applications are multilayer modules fabricated from silicon and Pyrex® glass. The performance of such burner modules is limited by their poor resistance to thermal shock. Burner modules made using conventional machining suffer from the lack of repeatability and size limitations, which manifest themselves in non-uniform flame fronts or restrictions of maximum flow.

SUMMARY

The present invention meets these and other needs by providing a burner module having a body that is either sintered or photo-cured and methods of making such a burner module. The body of the burner comprises one of a sintered metal, a sintered alloy, a laminated glass ceramic, and a photo-cured polymer. Sintering and photo-curing may be accomplished by irradiating the body with localized heating using a focused energy source, such as a laser. The burner module is resistant to thermal shock and provides a distributed, even stream of a precursor or precursors to be reacted in a flame of the burner module to form soot, which is to deposited on a receptor surface, and may be used for vapor and liquid precursor delivery systems. A soot deposition system having an array of such burner modules and methods of making a fused silica article by depositing soot using the burner modules are also described.

Accordingly, one aspect of the invention is to provide a burner module. The burner module comprises: a body that is either sintered or photo-cured; a plurality of inlets disposed on a base of the body and including at least one combustion gas inlet, at least one oxidizer inlet, optionally at least one inert gas inlet, and at least one precursor inlet, wherein the at least one combustion gas inlet provides a combustion gas to the burner module, the at least one oxidizer inlet provides an oxidizing gas to the burner module, the at least one inert gas inlet provides an inert gas to the burner module, and the at least one precursor inlet provides a soot precursor to the burner module; and a plurality of apertures disposed on a planar face of the body distal from the base, the planar face having a length. Each of the plurality of apertures is in fluid communication through a fluid pathway with one of the at least one combustion gas inlet, the at least one oxidizer inlet, the at least one inert gas inlet, and the at least one precursor inlet. The burner module delivers the at least one combustion gas, the at least one oxidizer, the at least one soot precursor, and the at least one inert gas through the plurality of apertures to a combustion site in a chemical vapor deposition process to produce a burner flame in a combustion zone proximate to the burner face. In one embodiment, the body comprises one of a sintered metal, a sintered alloy, a laminated glass ceramic, and a photo-cured polymer.

A second aspect of the invention is to provide a soot deposition system. The soot deposition system comprises: a burner assembly comprising a plurality of burner modules arranged in an ordered array; at least one combustion gas source, at least one oxidizer source, at least one inert gas source, and at least one precursor source, wherein the at least one combustion gas source is in fluid communication with each of the plurality of burner modules and provides a combustion gas to the burner module, the at least one oxidizer source is in fluid communication with each of the plurality of burner modules and provides an oxidizing gas to the burner module, the at least one inert gas inlet is in fluid communication with each of the plurality of burner modules and provides an inert gas to the burner module, and the at least one precursor inlet is in fluid communication with each of the plurality of burner modules and provides a soot precursor to the burner module; and a receptor, the receptor having a surface onto which soot created by combustion at the combustion site is deposited. At least one of the burner modules comprises: a body that is either sintered or photo-cured; using a focused energy source; a plurality of inlets disposed on a base of the body, the plurality of inlets comprising at least one combustion gas inlet, at least one oxidizer inlet, optionally at least one inert gas inlet, and at least one precursor inlet, disposed on a base of the body, wherein the at least one combustion gas inlet provides a combustion gas to the burner module, the at least one oxidizer inlet provides an oxidizing gas to the burner module, the at least one inert gas inlet provides an inert gas to the burner module, and the at least one precursor inlet provides a soot precursor to the burner module; and a plurality of apertures located on a planar face of the body opposite the base, the planar face having a length, wherein each of the plurality of apertures is in fluid communication through a fluid pathway with one of the at least one combustion gas inlet, the at least one oxidizer inlet, the at least one inert gas inlet, and the at least one precursor inlet through a fluid pathway; wherein the burner module delivers the at least one combustion gas, the at least one oxidizer, the at least one soot precursor, and the at least one inert gas through the plurality of apertures to a combustion zone in a chemical vapor deposition process to produce a burner flame in the combustion zone proximate to the burner face. In one embodiment, the body comprises one of a sintered metal, a sintered alloy, a laminated glass ceramic, and a photo-cured polymer, wherein the sintered metal and sintered alloy are sintered by localized sintering.

A third aspect of the invention is to provide a method of making a burner module. The burner module comprises a plurality of inlets disposed on a base of the body, and a plurality of apertures located on a planar face of the body opposite the base, wherein each of the plurality of apertures is in fluid communication with one of the plurality of inlets through a fluid pathway. The method comprises the steps of: providing a plurality of layers of at least one material; sintering or photo-curing a portion of each of the plurality of layers before adding the next of the plurality of layers to form the body of the burner module; and removing unsintered or unphoto-cured material to form the plurality of inlets, the plurality of apertures, and the fluid pathways of the burner module.

A fourth aspect of the invention is to provide a method of making a burner module. The burner module comprises a body comprising one of a sintered metal and a sintered alloy, a plurality of inlets disposed on a base of the body, and a plurality of apertures located on a planar face of the body opposite the base, wherein each of the plurality of apertures is in fluid communication with one of the plurality of inlets through a fluid pathway. The method comprises the steps of: providing a plurality of layers of at least one of a metallic powder and an alloy powder; sintering a portion of each of the plurality of layers before adding the next of the plurality of layers to form the body of the burner module; and removing unsintered metallic powder or alloy powder to form the plurality of inlets, the plurality of apertures, and the fluid pathways of the burner module.

A fifth aspect of the invention is to provide a method of making a burner module. The burner module comprises a body comprising a laminated glass ceramic, a plurality of inlets disposed on a base of the body, and a plurality of apertures located on a planar face of the body opposite the base, wherein each of the plurality of apertures is in fluid communication with one of the plurality of inlets through a fluid pathway. The method comprises the steps of: providing a plurality of greensheets, wherein each of the greensheets comprises a glass ceramic; removing predetermined portions of one of the greensheets and the laminate to form the plurality of inlets, the plurality of apertures, and the fluid pathways of the burner module; laminating the greensheets to each other to form the body of the burner module; and removing predetermined portions of one of the greensheets and the laminate to form the plurality of inlets, the plurality of apertures, and the fluid pathways of the burner module.

A sixth aspect of the invention is to provide a method of making a soot article. The method comprises the steps of: providing at least one burner module comprising a body, the body comprising one of a sintered metal, a sintered alloy, a laminated glass ceramic, and a photo-cured polymer; providing a receptor; providing a combustion gas, an oxidizing gas, at least one soot precursor and, optionally, optionally at least one inert gas to the at least one burner module, wherein the combustion gas, the oxidizing gas, and at least one soot precursor pass through a plurality of apertures in a planar face of the at least one burner module to a combustion site; combusting the combusting gas with the oxidizing gas in the presence of the at least one soot precursor at the combusting site to form a soot, wherein that the resulting burner flame is uniform across the length of the planar face of the body; and depositing the soot on the receptor to form the soot article. In one embodiment, the body comprises one of a sintered metal, a sintered alloy, a laminated glass ceramic, and a photo-cured polymer, wherein the sintered metal and sintered alloy are sintered by localized sintering.

These and other aspects, advantages, and salient features of the present invention will become apparent from the following detailed description, the accompanying drawings, and the appended claims.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms. In addition, whenever a group is described as comprising at least one of a group of elements and combinations thereof, it is understood that the group may comprise, consist of, or consist essentially of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the recited range.

Figure 1:
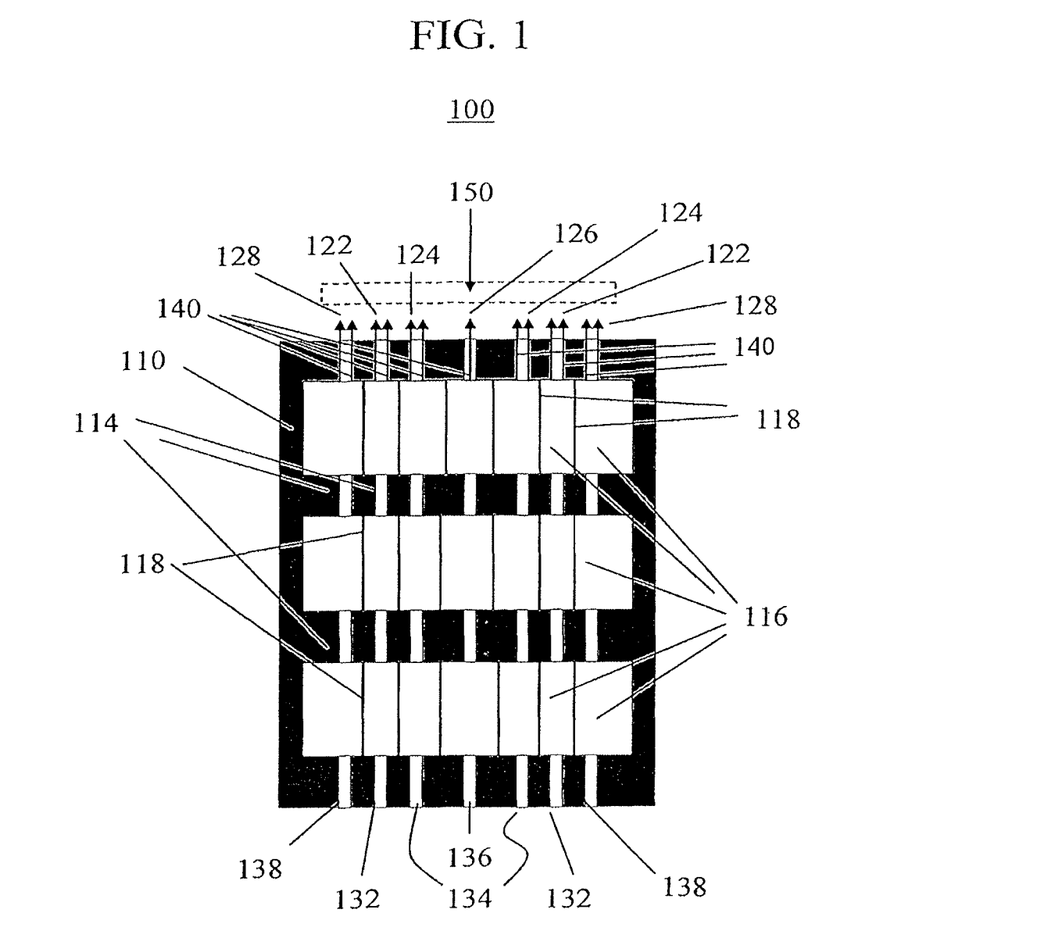
FIG. 1 is a schematic representation of a burner module.

Referring to the drawings in general and to FIG. 1 in particular, it will be understood that the illustrations are for the purpose of describing a particular embodiment of the invention and are not intended to limit the invention thereto.

Turning to FIG. 1, a simplified schematic representation of a burner module of the present invention is shown. Burner module 100 comprises a body 110. In the embodiment shown in FIG. 1, body 110 comprises a sintered or photo-cured material, such as a metal or photo-curable polymer. In one embodiment, the body is sintered or photo-cured using radiation from a directed energy source such as, for example, a laser. Body 110 includes at least one combustion gas inlet 132, at least one oxidizer inlet 134, at least one precursor inlet 136, and, optionally, at least one inert gas inlet 138, disposed on a base of body 110. The at least one combustion gas inlet 132 provides at least one combustion gas 122, such as methane or hydrogen, to the burner module 100 In one embodiment, the at least one combustion gas 122 may be premixed with oxygen. The at least one oxidizer inlet 134 provides an oxidizing gas 124 such as oxygen to the burner module 100, the at least one inert gas inlet 138 provides an inert gas 128 such as nitrogen to the burner module 100, and the at least one precursor inlet 136 provides a soot precursor 126 to the burner module.

A plurality of apertures 140 is located on a planar face 150 (FIG. 3) of body 110. Each of the plurality of apertures 140 is in fluid communication with one of the at least one combustion gas inlet 132, the at least one oxidizer inlet 134, optionally the at least one inert gas inlet 132, and the at least one precursor inlet 136 through a fluid pathway. Burner module 100 delivers the at least one combustion gas 122, the at least one oxidizer 124, the at least one soot precursor 126, and, optionally, the at least one inert gas 120 through the plurality of apertures 140 to a combustion zone 160 proximate to face 150 in a chemical vapor deposition process such that the resulting burner flame is uniform across the length/of planar face 150 (FIG. 3) of body 110. The flow velocity and pressures through apertures 140 vary by less than a predetermined value.

In order to ensure that the profile of the burner flame is uniform, each fluid pathway includes a plurality of channels or "pressure plates" 114 separated by chambers 116 of greater volume. Pressure plates 114 ensure that gases disperse evenly through apertures 140 that are in fluid communication with chamber 116. Adjacent chambers 116 are separated by dividers or ribs 118. It will be readily understood by those skilled in the art that burner module 100 could comprise a greater or fewer number of channels, pressure plates, chambers, and the like than shown. For example, burner module 100 could include additional distributor layers or a filter layer (not shown) for filtering gasses and precursors flowing through the burner (not shown).

Figure 3:
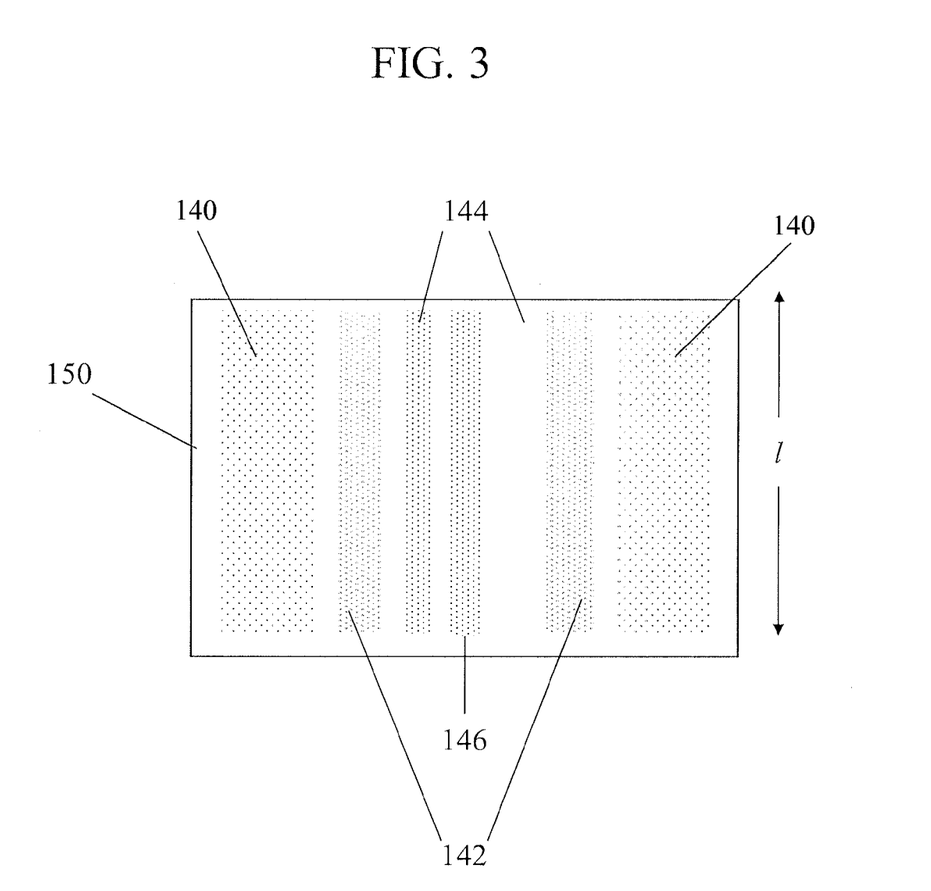
FIG. 3 is a schematic representation of an array of a plurality of apertures on a face plate of a burner module.

The plurality of apertures 140 are typically arranged in an overall array on face plate 150 (FIG. 3). The plurality of apertures 140 are patterned to equalize the flow of fluid (or gas) along the length of burner module 100 so that the rate of flow through the plurality of apertures 140 is more uniform. As a result, a more uniform flame in combustion zone 160 and distribution of soot and glass precursors is provided. The array may include individual sub-arrays, each having a pre-determined number of apertures 140 of pre-selected diameters. An example of such sub-arrays is shown in FIG. 3, which shows: arrays 142 of apertures for a combustion gas; arrays 144 of apertures for an oxidizing gas, an array 146 of apertures for the soot precursor; and arrays 148 of apertures for an inert covering gas. It is understood that the arrangement of apertures and arrays for the soot precursor and the combustion, oxidizing, and inert gases shown in FIG. 3 is only one example of such arrangements and arrays, and that other configurations are possible and within the scope of the invention. For example, an array 142 of apertures for the combustion gas may be disposed between array 144 of apertures for the oxidizing gas and array 146 of apertures for the soot precursor. In addition, any of the arrays may have greater or fewer apertures or rows of apertures than those shown in FIG. 3.

Figure 7:
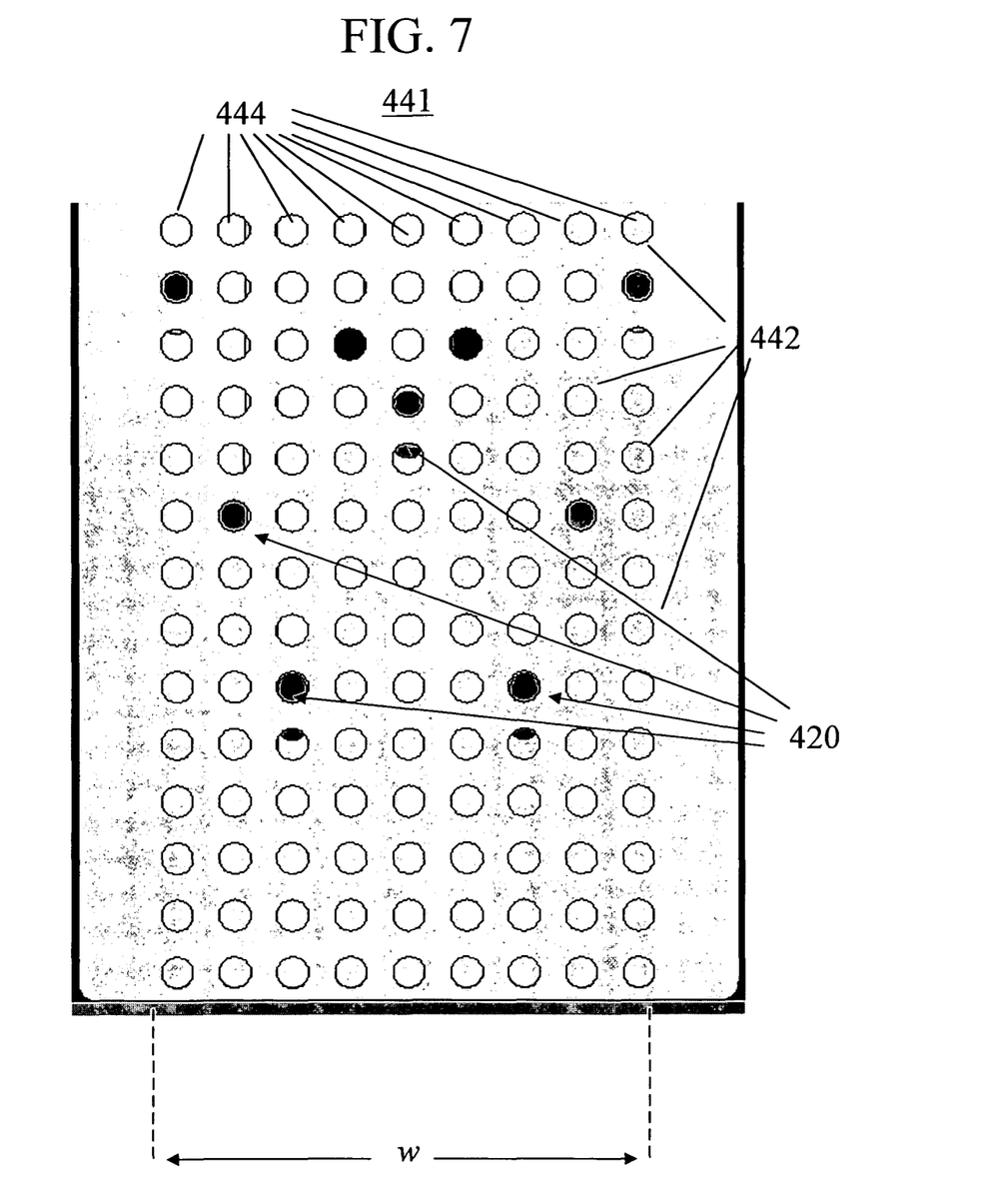
FIG. 7 is a top view of a burner face.

In one particular embodiment, the overall array of apertures includes a plurality of apertures arranged in n parallel rows, wherein n≥5. An example of an array 441, having nine rows 444 of apertures 442, is shown in FIG. 7. The array 441 of parallel rows 444 has a width w that is defined by the distance between outer edges of the apertures disposed on opposite outer edges of array 441. The ratio of the number of rows n to the width of the array—i.e., n/w—is greater than 0.6 $mm^{-1}$.

Figure 4:
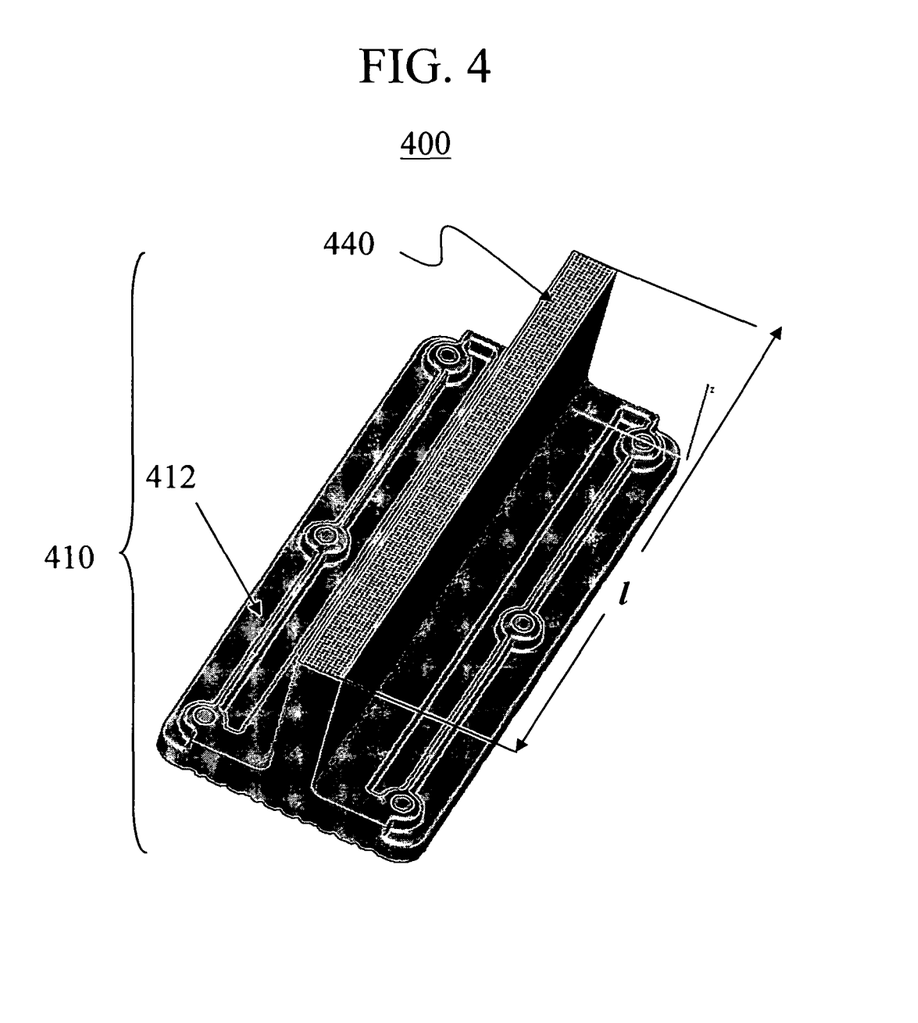
FIG. 4 is a perspective view of a burner formed by laser sintering.

FIG. 4 is a perspective view of a burner formed by laser sintering as described herein. Burner 400 has a body 410, which includes a base 412 through which gases enter burner 400, and burner face plate 440, through which gases exit burner 400. Burner face plate 440 shown in FIG. 4 has a length l of 9 inches (about 22.5 cm). the length of burner face plate 440 may vary in order to adapt burner 400 to different deposition systems; for example, a length of one inch (2.54 cm) may be used.

Figure 5:
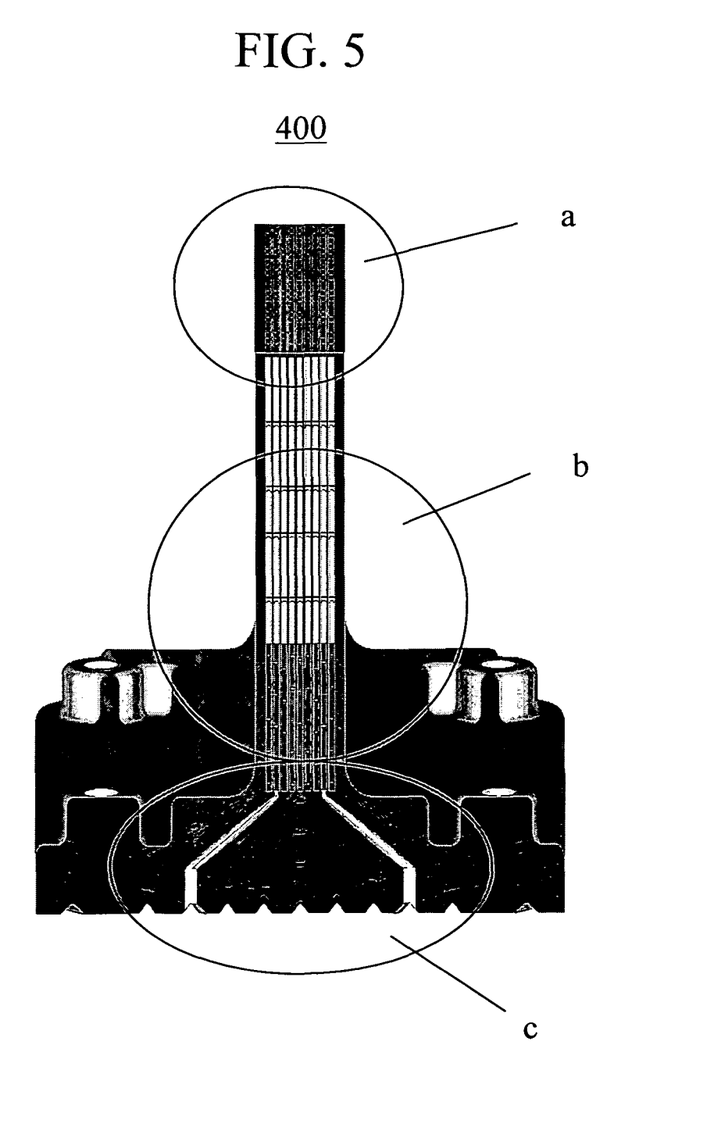
FIG. 5 is a cross-sectional view of a burner.
Figure 6A:
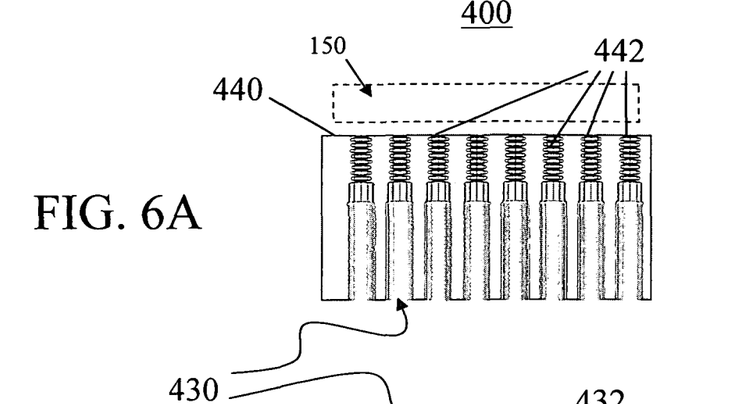
FIG. 6a is a detailed view of region A in FIG. 5.
Figure 6B:
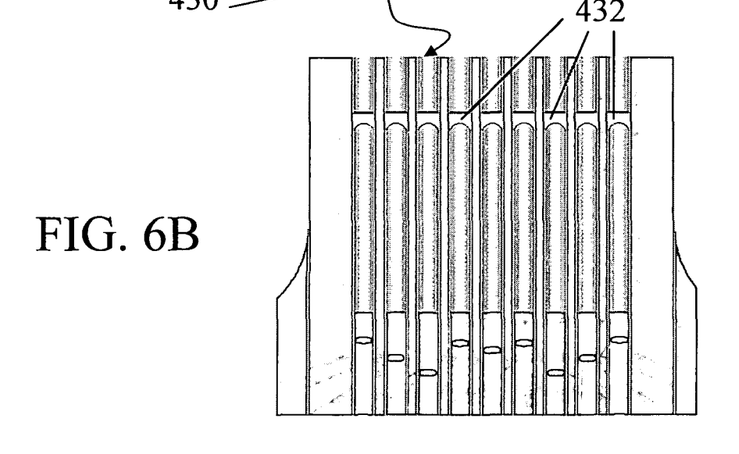
FIG. 6b is a detailed view of region B in FIG. 5.
Figure 6C:
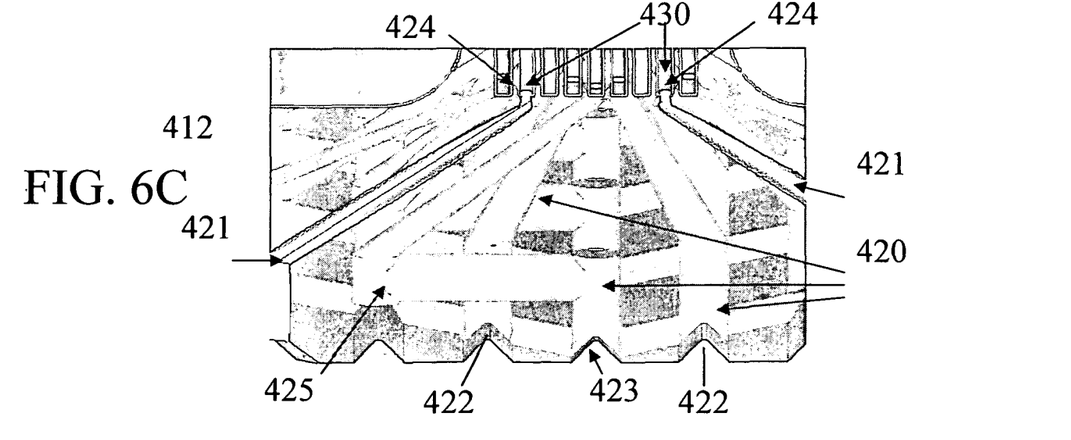
FIG. 6c is a detailed view of region C in FIG. 5.

A cross-sectional view of burner 400 is shown in FIG. 5. Details of the burner face plate 440 (region A in FIG. 5), flow chambers 430 (region B in FIG. 5), and gas inlet tubes 420 (region C in FIG. 5) are shown in FIGS. 6a, 6b, and 6c, respectively. The various gases enter burner 400 through gas inlets 421 (FIG. 6c). Each gas inlet tube 420 extends from a gas inlet 422 on base 412 to an inlet 424 of flow chamber 430, which in turn is in fluid communication with an aperture 442 on face plate 440. FIG. 6c shows two gas inlet tubes 421 in fluid communication with two separate flow chambers 430. In one embodiment, it is advantageous to provide the various gases to apertures 442 on burner face plate 440 at approximately the same mass flow rate or velocity. To facilitate this, all of gas inlet tubes 420 should be approximately equal in length. In one embodiment, this would not be accomplished if each gas followed a straight path to a flow chamber, due to the location of the inlets of the gas inlet tubes in base 410. Accordingly, certain gas inlet tubes may follow a path to an inlet in which the gas inlet tube makes at least one bend. An example of such path is shown, for example in FIG. 6c, where gas inlet tube 423 makes a right angle bend and an acute angle bend 425 before connecting with flow chamber 430.

Flow chambers 430, shown in detail in FIG. 6b, each include a chamber and mixing bracket 432 to facilitate flow and pressure adjustment of gases. However, various additional features such as pressure plates, baffles, tortuous paths, and alike, as previously described herein. Each flow chamber 430 terminates in a row of apertures 442, located on burner face plate 440 (FIG. 6c).

Channels, pressure plates, chambers, other flow-altering or flow-limiting structures described herein, and arrays of apertures serve to equalize the flow of gases along the length l of face plate 150 of burner 100, so that the rate and pressure of the flow of gases through apertures 140 is more uniform. As a result, a more uniform flame and distribution of glass precursors is provided. Such uniformity may be characterized in terms of the uniformity in the height of the flame cone, temperature profile of the flame cone, velocity or pressure distributions of gases, and gas concentrations across the width and along the length of the array of apertures 140.

Figure 9:
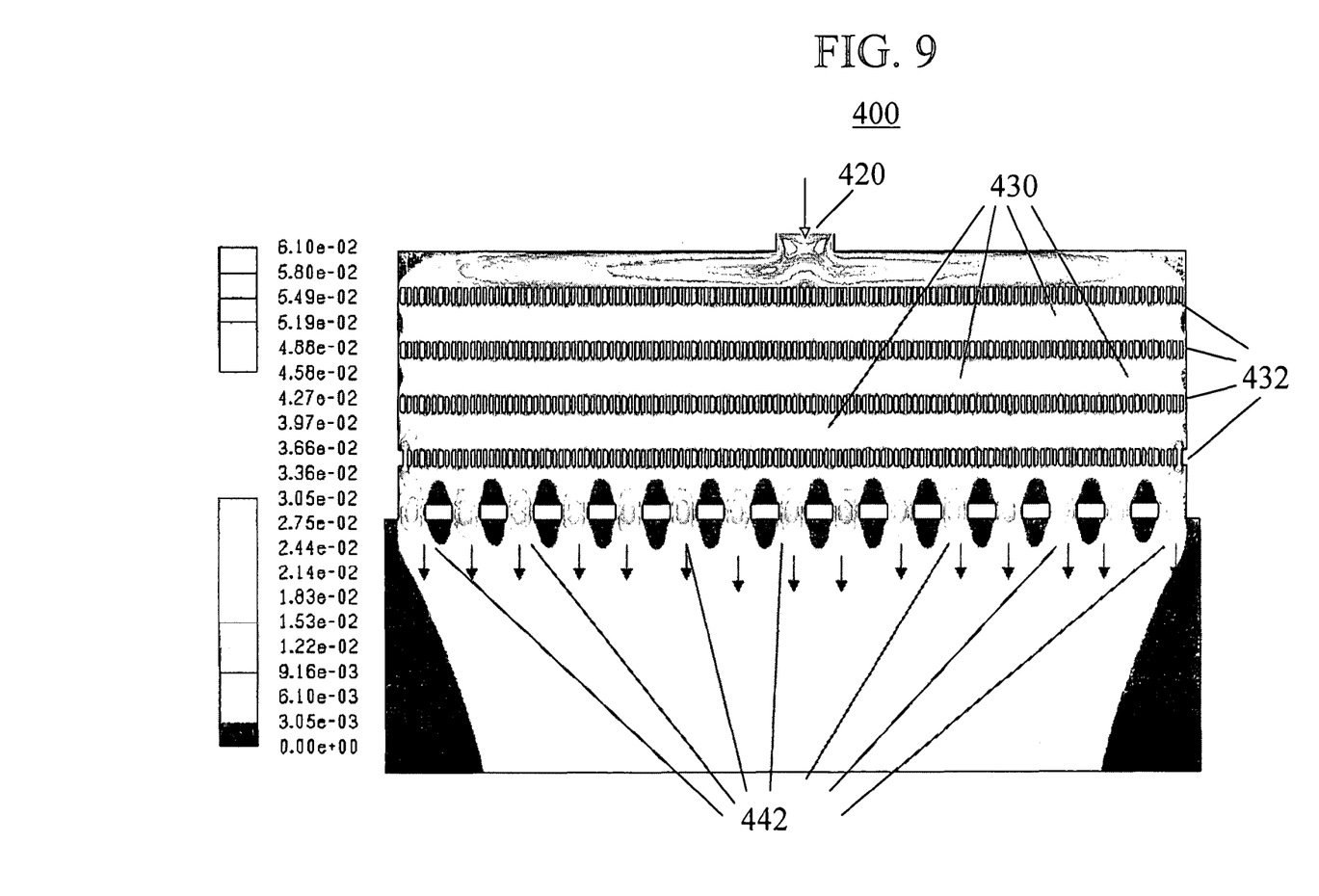
FIG. 9 shows computer modeled gas flow contours for a center-fed burner design.
Figure 10:
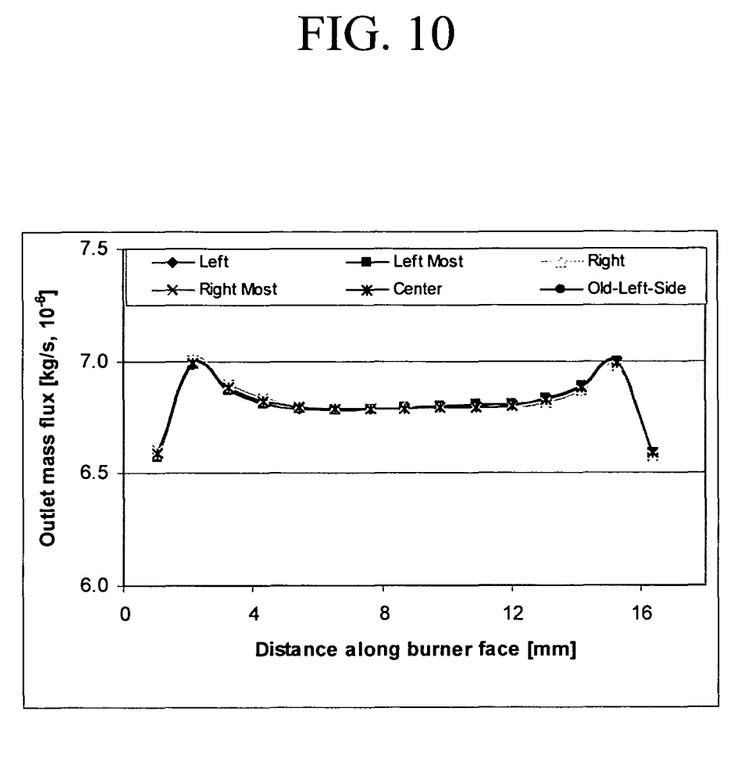
FIG. 10 is a plot of optimized flow velocities, modeled for center- and side-fed gas inlets, as a function of aperture position.

An example of computer modeled gas flow contours for a particular burner design 400 is shown in FIG. 9. Gas flow velocity contours ranging from $3 \times 10^{-3}$ m/s to $6 \times 10^{-2}$ m/s are shown in grayscale. Gas is center-fed to burner 400 through gas inlet tube 420 (i.e., gas inlet 420 is located at center position at the bottom of the burner) and passes through a series of pressure plates 434 and chambers to evenly distribute the gas to apertures 442 and provide a uniform distribution of velocities when exiting apertures 442. In other embodiments, gases may be side-fed (i.e., gas inlet 420 is offset from the center of the burner) to burner 400. In such instances, the size and number of pressure plates 434, chambers, 430, mixing brackets 432 (FIG. 6b), and the like may be adjusted to provide a uniform distribution profile of gas velocities and pressures over the length of burner face plate 440, as shown in FIG. 10, in which optimized flow velocities modeled for center- and side-fed gas inlets are plotted as a function of aperture position along length l of burner face plate 440. Optimized design yields uniform flow independent of inlet location along length l. With the exception of boundary regions that include 2-5 apertures at each end of the array, flame cones, temperature profiles, and gas concentrations should be substantially uniform along the length l of the burner.

Various configurations of fluid pathways and arrays of apertures are described in: U.S. Pat. No. 6,736,633, entitled "Burner Manifold Apparatus for Use in a Chemical Vapor Deposition Process," by David F. Dawson-Elli et al., issued May 18, 2004; U.S. Pat. No. 6,743,011, entitled "Multi-Layer Burner Module, Adapter, and Assembly Therefor," by Shivilak Bakshi et al., issued Jun. 1, 2004; and U.S. Pat. No. 6,837,076, entitled "Method of Producing Oxide Soot Using a Burner with a Planar Burner Face," by Daniel W. Hawtof, issued Jan. 4, 2005. The contents of these patents are incorporated herein by reference in their entirety.

In operation, a soot precursor material is delivered to precursor inlet 136 in burner module 100, flows through the fluid pathway, and exits the burner through main orifice 126. The soot precursor may also flow through a predetermined fluid pathway and exit the burner through array 146 (FIG. 3) of apertures 140 (FIG. 1). The soot precursor may be in liquid or vapor form. However, when the precursor is delivered to the burner in liquid form, the main orifice 126 preferably further includes an atomizing element. A inert gas such as nitrogen gas and an oxidizing gas such as oxygen (or a mixture thereof) may optionally be delivered to predetermined fluid pathways via at least one inert gas inlet 130 and at least one oxidizer inlet 134, respectively, and exit through apertures 140, located in arrays 148 and 144, respectively, in planar face 150 (FIG. 3). A combustible gas such as methane (or a mixture of methane and oxygen) may be delivered to a separate fluid pathway via at least one combustion gas inlet 134 and exit the burner through aperture 140 located in arrays 142 in planar face 150 (FIG. 3). The combustible gas flowing through apertures 140 in arrays 142 is ignited to provide a flame in combustion zone 160 in which the soot precursor is converted to an inorganic soot, such as, for example, a silica soot that may later be consolidated to form a fused silica article. In one embodiment, burner module 100 is capable of depositing a silica soot article having a density of between about 0.37 g/cm$^3$ and about 1.1 g/cm$^3$ on a substrate. In one embodiment, burner module 100 is capable of depositing a silica soot article having a density variation of less than about 10% and, in one embodiment less than about 1%, over a length equal to the length of the burner face.

A variety of silicon containing precursor materials may be used as soot precursors with burner module 100. Such precursor materials include, but are not limited to, halide-containing precursors such as silicon tetrachloride; halide-free precursors such as, for example, siloxanes, particularly, polyalkylsiloxanes such as octamethylcyclotetrasiloxane (OM-CTS). In addition, appropriate dopants may be used with burner module 100. These dopants may be delivered with the soot precursor to burner module 100. Alternatively, the dopants may be delivered to burner module 100 through a separate inlet and exit the burner through a separate aperture or array of apertures. Appropriate dopants include, but are not limited to, $P_2O_5$ and at least one metal oxide selected from the group consisting of Groups IA, IB, IIA, IIB, IIIA, IIIB, IVA, VA, and the rare earth series of the Periodic Table of Elements.

In one embodiment, shown in FIG. 1, body 110 of burner module 110 is formed by localized sintering of a metal, metal alloy, or glass ceramic powder. As used herein, "localized sintering" refers to the sintering of a thin layer of material by irradiating the material using a focused energy source such as a laser, an electron beam (e-beam), or microwave source.

In one embodiment, the localized sintering is carried out by irradiating the material with a laser beam. Laser sintering is an additive manufacturing technique that uses a high power laser (such as, for example, a laser beam generated by a YAG laser or a carbon dioxide laser) to fuse small particles of plastic, metal, or ceramic powders into a mass representing a desired three-dimensional object. The laser beam selectively fuses powdered material by scanning cross-sections on the surface of a powder bed. Such cross-sections may be generated from a three-dimensional digital description of the part (e.g., from a CAD file or scan data). After each cross-section is scanned and sintered, the powder bed is adjusted by one layer thickness, a new layer of material is applied on top of the previously scanned and sintered layer, and the process is repeated until the object is completed. The physical process can be full melting, partial melting, or liquid-phase sintering of the powder. Depending on the material used, up to 100% density can be achieved with material properties comparable to those obtained using conventional manufacturing methods.

In the laser sintering of a burner module, for example, a layer of metallic or alloy powder, having a thickness of up to about 10 particle diameters, is provided to a platform or support. A metal or alloy powder is irradiated by a laser, causing localized heating of the powder. The localized heating creates a local melt pool in which the powder at least partially melts and densifies. A second layer of metallic or alloy powder is then disposed on the now-sintered first layer. The second layer of powder is then irradiated with the laser beam and sintered. The second layer is joined to the previous layer by the sintering as well. The process of providing and laser sintering powder layers is repeated until a near net shape burner module having the desired size and features is obtained. The near net shape may then be etched to provide more uniform apertures, channels, chambers, and the like, and to provide a more uniform surface finish.

Complex three-dimensional features may be formed in the near net shape burner module by selectively irradiating—or not irradiating—selected portions of each powder layer with the laser. In a burner module, such features may include, but are not limited to, filter plates, chambers, inlets, outlets, baffles, porous media, torturous paths, and the like that are known in the art. Such features provide a predetermined flow profile along the planar face 150 of burner module 100. The predetermined flow profile may be either uniform or non-uniform. The laser beam may be scanned or rastered over the surface of the layer of powder such that selected areas of the powder layer are not irradiated, and therefore remain unsintered. This unsintered powder is removed after the near net shape is formed, leaving behind features such as channels, chambers, baffles, porous plates, and the like. The unsintered metallic or alloy powder may be removed through powder vents formed during the fabrication of the near net shape burner by application of vacuum in conjunction with vibrating the near net shape burner module.

The metallic, alloy, or glass ceramic powder comprises one of a metal in elemental form, an alloy, or a glass ceramic that couples with or absorbs radiation at the wavelength of the radiation used for sintering. The absorptivity of the powder at that wavelength should be of such magnitude that a portion of the energy provided by the layer is transferred to the previously sintered adjacent layer, thus causing sintering between layers. If the absorptivity of the powder is too great, then either the top most unsintered layer of powder will completely melt or insufficient energy will be transferred to the previously sintered layer, thus causing poor bonding between adjacent layers. If the absorptivity of the powder is too low, then insufficient sintering will take place to form a part having sufficient structural integrity.

In one embodiment, a YAG laser is used to sinter metallic or alloy powder. Metal and alloys that have suitable absorptivities at YAG laser wavelengths include, but are not limited to: titanium alloys, such as Ti-6Al-4V and the like; copper alloys, such as Cu-10Sn alloys, Cu—Ni alloys, and the like; cobalt superalloys, such as Co—Cr alloys, Co—Mo alloys, and the like; nickel superalloys, such as Inconel 625, Inconel 738, Haynes 230, and the like; high strength alloy steels, such as 1018, 1020, H13, A2, CPM-9V steels, and similar steels; and stainless steels, such as 17-4, 14-4, 13-8, 316, 420 stainless steels, and the like.

The thickness of each layer of powder that may be sintered depends in part upon the size of the powder. Thicker layers may be laser sintered if larger sized powders are provided. Conversely, if smaller size powders are provided, thinner laser sintered layers are formed. In one embodiment, the median diameter of the metallic or alloy powder is about 20 μm.

In another embodiment, body 110 is formed by photo-curing mixtures of a photoinitiator and at least one of an epoxy or acrylate to from a polymer body. The polymer body is prepared in a method that is analogous to the method of making body 110 by laser sintering of metals and alloys, described herein. A mixture of a liquid resin, such as an epoxy, and a photoinitiator is provided. The polymer may be an unfilled resin or acrylate, or may contain filler particles such as silica, metal powders, and the like. A portion of a first layer of the mixture is selectively irradiated to photo-cure and solidify the polymer, thus forming a layer of body 110. In one embodiment, the mixture is irradiated with a laser beam, such as, for example, one generated by a UV laser emitting light having a wavelength of 355 nm. The laser beam selectively photo-cures material by scanning cross-sections on the surface of the liquid mixture. Such cross-sections may be generated from a three-dimensional digital description of the part (e.g., from a CAD file or scan data). After each cross-section is scanned and photo-cured, a new layer of material is applied on top of the previously scanned and photo-cured layer, and the process is repeated until the object is completed. Photo-curing also serves to join the layer to the previously photo-cured layer. The process of providing and photo-curing layers of the mixture is repeated until a near net shape burner module having the desired size and features is obtained. In one embodiment, the polymer is stable (i.e., does not melt, decompose, slump, flow, or otherwise significantly degrade) at temperatures greater than or equal to about 200° C.

The dimensions of the three dimensional features in a burner module formed by laser sintering are in part determined by the particle size of the metal or alloy powder that is used to form the module. For example, when 20 μm powders are laser sintered using a YAG laser, filter plate channels and gas outlets having diameters of about 750 μm are formed. Smaller dimensions are obtainable if higher resolution lasers and/or powders having smaller particle sizes are used. However, such changes in process parameters result in increased manufacturing time due to increased laser scan time for each layer and the use of thinner individual layers of powder. In general, the laser sintering technique is capable of producing three dimensional features such as filter plate channels, chambers, gas outlets, and the like, in a range from about 100 μm up to about 1500 μm.

The laser-sintered near net shape burner module has roughened surfaces that are attributable to the shapes of individual particles that have been sintered together. In order to ensure that the gases exiting the burner module have a uniform, flat profile, it is desirable that the filter plates and chambers have smooth surfaces. In addition, smooth surfaces are advantageous for mating burner module gas inlets to gas supplies. Accordingly, selected surfaces of the burner module may be polished or etched. To facilitate joining of burner module gas inlets to gas supplies, the bottom of the burner module may be electron discharge (EDM) milled and touch-polished. To facilitate a uniform profile of gases exiting the burner module, the top of the burner module may be touch-polished, milled, or etched. Holes in filter plates and chambers may be smoothed by extrusion honing, in which abrasive media flows through holes and chambers in the burner module to smooth out high points, or by etching.

Figure 2:
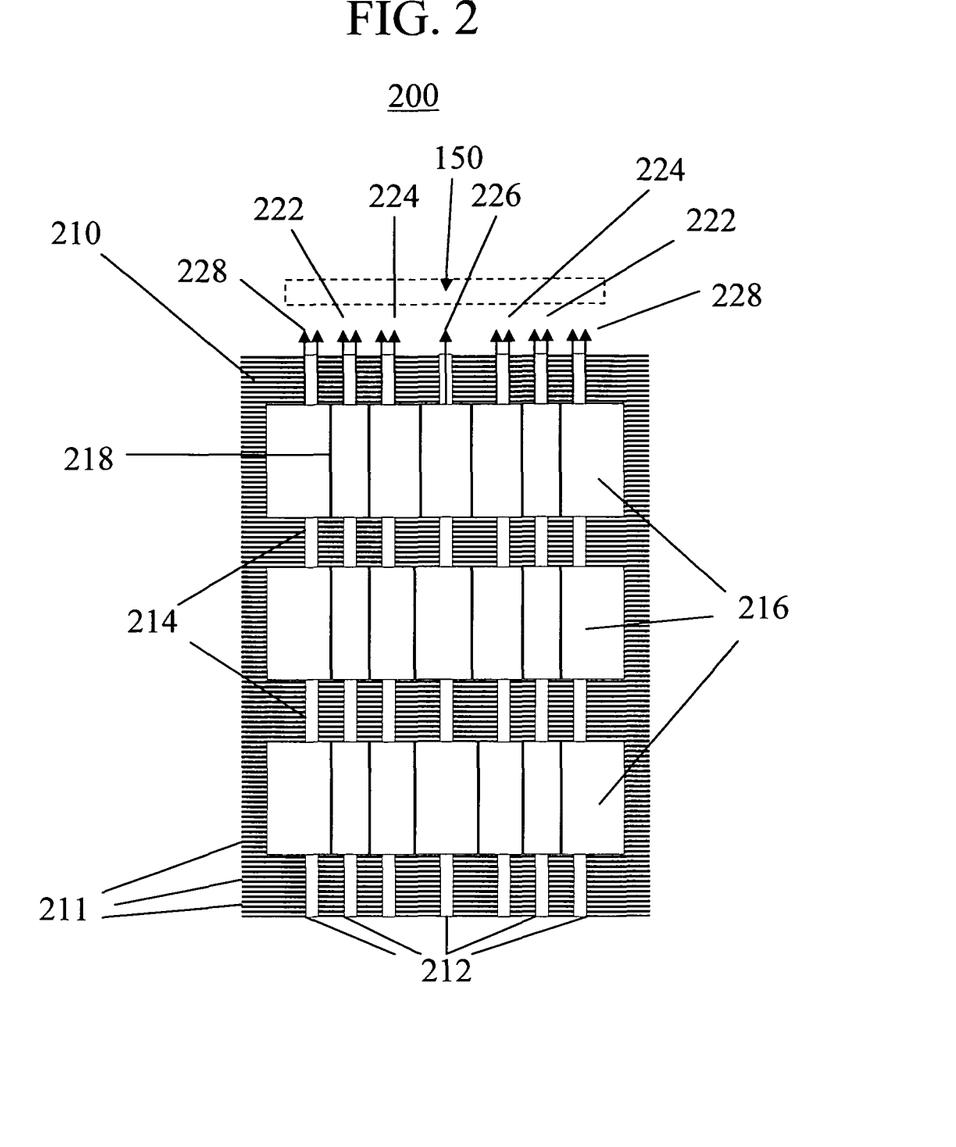
FIG. 2 is a schematic representation of a burner module comprising a laminate of glass ceramic sheets.

In another embodiment, schematically shown in FIG. 2, the burner module 200 is a laminate of glass ceramic sheets 211. Individual 'green' glass ceramic sheets (greensheets), comprising silica or any other suitable material known in the art, are first formed. In one embodiment, each individual greensheet 211 has a thickness of in a range from about 100 μm up to about 150 μm.

A laminate is then formed from a plurality of individual greensheets by sintering or interlayer growth. In one embodiment, the lamination process involves heat, pressure and time, and may additionally include sintering. In a particular embodiment, for example, the greensheets are laminated at temperature of less than 90° C. and a pressure of less than 800 psi for a time of less than 5 minutes. The sintering process involves the material of choice and the binder system used to form the greensheets. The sintering process may include heating the laminate at temperatures of less than about 2000° C., and can be isostatic, free, and/or conformal.

Complex three dimensional shapes may be formed in the laminate by removing selected portions from individual greensheets prior to lamination or from the laminate itself. Techniques for material removal include mechanical techniques such as punching out material, laser drilling, e-beam drilling, sandblasting, and high pressure liquid jets. Non-material-removal techniques such as embossing, pressing, forming, and casting may also be used to form the three dimensional shapes. When laminated, individual glass ceramic sheets are aligned such that the selected portions in the individual sheets mate with those in adjacent glass ceramic sheets to form the desired three dimensional structures.

The complex three dimensional shapes formed in the glass ceramic laminate burner module may typically have dimensions that are about an order of magnitude less than those formed in the laser-sintered burner module. In one embodiment, each of the plurality of apertures in the glass ceramic laminate burner has a diameter of in a range from about 20 microns up to about 100 microns. For example, holes having a diameter of 40 μm may be formed in the glass ceramic laminate, whereas holes in the laser-sintered burner module each have a diameter of about 750 μm.

The dimensions of such three dimensional features at least partially determine the extent to which gases exiting the burner module have a uniform, flat profile. Smaller dimensions of channels, chambers, and the like permit such a profile to be achieved over a smaller distance in a burner module, whereas a burner module comprising filter plates, channels, chambers, and the like having larger dimensions requires a greater distance to achieve an acceptable profile. Because smaller three dimensional features are obtainable in the laminated glass ceramic burner module, the total height of the burner module is about 10 mm.

Due to the nature of the glass ceramic and the means used to generate the three dimensional features, the internal surfaces (i.e., the surfaces of chambers, channels, etc.) of the laminated glass ceramic burner module—unlike those of the near net shape laser sintered burner module—are very smooth. Consequently, little or no post-forming smoothing operation is necessary.

In certain embodiments described herein, body 110 of burner module 100 is monolithic; i.e. body 100 consists of a single material, such as a sintered metal or alloy, a photo-cured polymer, or a glass-ceramic laminate, as described herein.

The laminated glass ceramic burner module, the laser-sintered burner module, and the photo-cured burner module exhibit greater thermal shock resistance than conventional burner modules fabricated from Pyrex® and silicon. The resistance to thermal shock enables holes to be formed near the edge of the front face of the burner module.

In a burner assembly comprising a plurality of such burner modules located adjacent to each other, allowing a uniform, linear flame—and thus uniform soot deposition—to be obtained. The burner modules may be oriented in various directions; e.g., with the burner face oriented upwards, downwards, sideways, or at an angle to a receptor.

The burner module may be used for vapor precursor delivery systems, wherein the precursor is vaporized remotely from the burner and delivered to the burner in vapor form using a carrier gas. Alternatively, the burner module may be used for liquid precursor delivery systems in which the precursor is delivered to the burner in liquid form and atomized and vaporized proximate the burner face. For embodiments in which the burner module is used in liquid delivery systems, the burner module includes an atomizing element in the structure of the burner for atomizing the liquid precursor prior to combustion.

A soot deposition system is also provided. The soot deposition system includes a burner assembly comprising a plurality of burner modules arranged in an ordered array. The array may be linear, circular, or any other geometrical arrangement of burner modules. The array may be oriented in various directions; e.g., with the faces of the burner modules oriented upwards, downwards, sideways, or at an angle to a receptor. The burner assembly comprises at least one burner module as described hereinabove, at least one combustion gas source, at least one oxidizing gas source, at least one inert gas source, and at least one soot precursor source, and a receptor having a surface onto which soot created by combustion is deposited. The receptor may be a flat substrate such as those used, for example, in the case of planar waveguide fabrication. Alternatively, the receptor may be rotating mandrel such as those used, for example, in the case of waveguide fiber fabrication using outside vapor deposition (OVD). In another embodiment, the receptor may be a rotating rod such as those used, for example, in the case of waveguide fiber fabrication using vapor axial deposition (VAD). The receptor may also be heated to maintain the surface at an essentially uniform temperature. The burner assembly and array may be capable of movement with respect to the receptor, or vice versa. In addition to the burner assembly, gas sources, and receptor, the soot deposition system may also include sintering furnaces, product collection means, and other elements known in the art to facilitate manufacture of selected products from soot on a desired scale. Examples of soot deposition systems are described in U.S. patent application Ser. No. 11/305,857, entitled "Method and Apparatus for Making Fused Silica," by Daniel W. Hawtof et al., filed Dec. 14, 2005, the contents of which are incorporated by reference herein in their entirety.

A method of making a soot article is also provided. In the first step, at least one burner module, as described hereinabove, is provided. A receptor having a surface onto which soot will be deposited is also provided. At least one combustion gas, at least one oxidizing gas, at least one soot precursor and, optionally, at least one inert gas are provided to the at least one burner module. The combustion gas, oxidizing gas, at least one soot precursor pass, and inert gas through a plurality of apertures in a planar face of the at least one burner module to a combustion site, where the combusting gas is combusted with the oxidizing gas in the presence of the at least one soot precursor at the combusting zone to form a soot such that the resulting burner flame in the combustion zone is uniform across the length of the planar face of the body. The soot formed by combustion is then deposited on the surface of the receptor to form the soot article. The spacing between apertures at the ends of the individual burners is less than or equal to the pitch—or spacing—of apertures on individual burners. Such spacing allows the flame emanating from the burner modules to be uninterrupted by the boundary between adjacent burner modules.

A top view of burner face plate 440 is shown in FIG. 7. The particular embodiment shown in FIG. 7 has an array 443 comprising nine rows 444 of apertures 442. Each row 444 of apertures 442 is in fluid communication with a separate flow chamber 430. The positions of gas inlet tubes 420 relative to apertures 442 in face plate 440 are shown in FIG. 7.

Figure 8A:
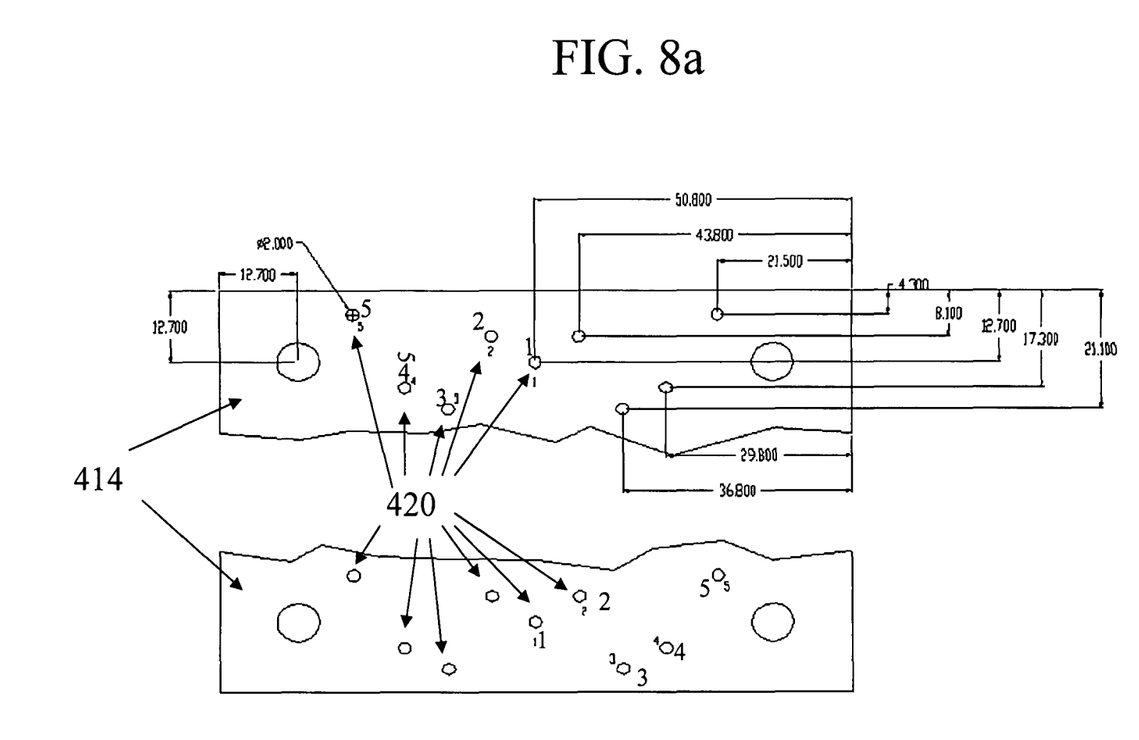
FIG. 8a is a view of a bottom face of a base of a burner.
Figure 8B:
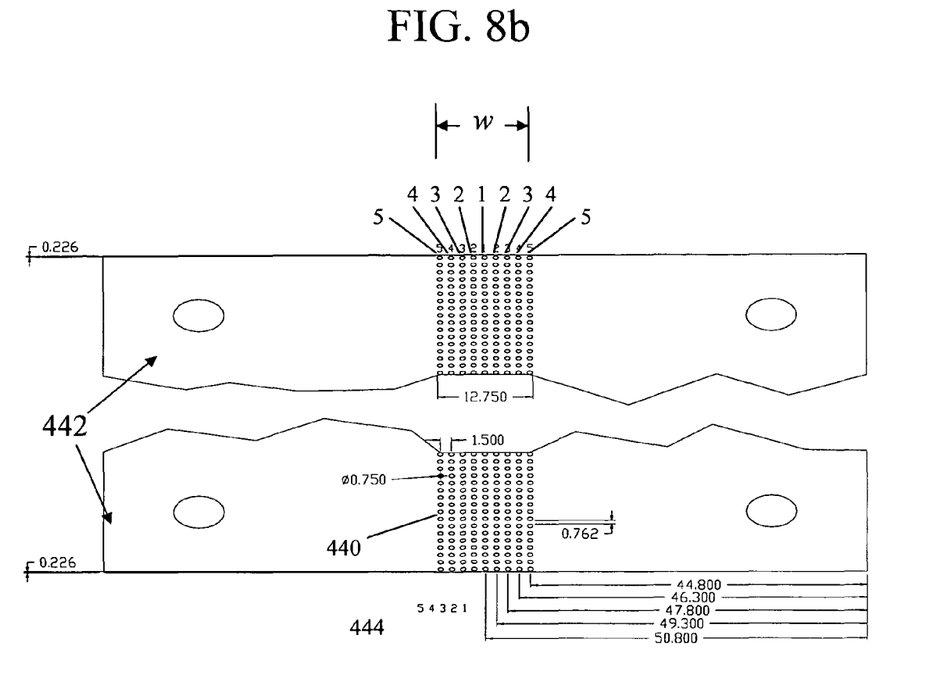
FIG. 8b is a view schematic representations of a burner face.

FIGS. 8*a* and 8*b* are schematic representations of the bottom face 414 of base 412 and face plate 440, respectively, of a burner 400, in which face plate 440 has a length of nine inches (about 22.5 cm). Face plate 440 has nine rows of apertures 442. Rows 444 of apertures 442 are labeled 1-5 for identification purposes, and are in fluid communication with the corresponding gas inlet tubes 420, which originate on bottom face 412 (8*a*).

As shown in FIG. 8*b*, each aperture 442 has a diameter of 0.750 mm. In each row, apertures 442 are spaced 0.762 mm apart, as measured from the edges adjacent apertures. Adjacent rows are 1.500 mm apart, as measured by center-to-center distance from apertures in adjacent rows. The overall width w of the array of rows, as determined by the distance between outer edges of the apertures disposed on opposite outer edges of the array (edge-to-edge), is 12.750 mm. The ratio of the number of rows n in the array to the width w of the array is 0.71 mm$^{-1}$.

A partial view of bottom face 414 of base 412 is shown in FIG. 8*a*. Gas inlet tubes 420 originate on bottom face. Each of gas inlet tubes 420 has a diameter of 2.00 mm and is in fluid communication with a single row 444 of apertures. In FIG. 8*a*, the origin points of gas inlet tubes in bottom face 414 are labeled 1-5 to indicate the row of apertures 442 on face plate 440 that the gas inlet tube is in fluid communication with.

Octamethylcyclotetrasiloxane (OMCTS) and nitrogen carrier gas are provided through gas inlet tube 1 to apertures 442 in row 1, located on the center line of face plate 440. OMCTS is provided at a rate of 15 g/min, whereas nitrogen is provided at a rate of 40 SLPM (standard liters per minute).

Rows 2-5 are arranged symmetrically about the centerline—and row 1—of face plate 440, splitting the flow of gases provided by different gas sources. Each gas travels from a gas source, to through a mass flow controller and a manifold (not shown), which splits the flow of gas. Row 2 provides an inner shield of oxygen gas at a rate of 10 SLPM, Rows 3 and 4 each provide supplemental oxygen at a rate of 18 SLPM, and row 5 provides a mixture of methane and oxygen at rates of 36 SLM and 26 SLPM, respectively.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

The invention claimed is:

1. A burner module, the burner module comprising:
 a. a body, wherein the body comprises a photo-cured polymer that is stable at temperatures greater than or equal to about 200 degrees Celsius and the photo-cured polymer comprises an acrylate or an epoxy resin;
 b. a plurality of inlets comprising at least one combustion gas inlet, at least one oxidizer inlet, optionally at least one inert gas inlet, and at least one precursor inlet, wherein the at least one combustion gas inlet provides a combustion gas to the burner module, the at least one oxidizer inlet provides an oxidizing gas to the burner module, the at least one inert gas inlet provides an inert gas to the burner module, and the at least one precursor inlet provides a soot precursor to the burner module; and
 c. a plurality of apertures located on a planar face of the body distal from a base of the body, the planar face having a length, wherein each of the plurality of apertures is in fluid communication through a fluid pathway with one of the at least one combustion gas inlet, the at least one oxidizer inlet, the at least one inert gas inlet, and the at least one precursor inlet; wherein the burner module delivers the combustion gas, the oxidizing gas, the soot precursor, and the inert gas through the plurality of apertures to a combustion site in a chemical vapor deposition process to produce a burner flame in a combustion zone proximate to the planar face.

2. The burner module according to claim 1, wherein the body is photo-cured by irradiation by a focused energy source, wherein the focused energy source is one of a laser, an electron beam source, and a microwave source.

3. The burner module according to claim 1, wherein each of the at least one combustion gas inlet, the at least one oxidizer inlet, the at least one inert gas inlet, and the at least one precursor inlet, and each of the plurality of apertures has a diameter in a range from about 100 microns up to about 1500 microns.

4. The burner module according to claim 1, wherein the burner module is capable of producing a flame that is substantially uniform across the length of the planar face of the body.

5. The burner module according to claim 1, wherein each of the plurality of apertures has a diameter of in the range from about 20 microns up to about 100 microns.

6. The burner module according to claim 1, wherein the fluid pathway includes at least one of a filter plate, pressure plates, chamber, baffles, a torturous path, porous media, and combinations thereof.

7. The burner module according to claim 6, wherein the array includes a plurality of apertures arranged in at least five parallel rows and has a width defined by a distance between outer edges of the apertures disposed on opposite outer edges of the array, and wherein the number of rows in the array divided by the width of the array is greater than $0.6 \text{ mm}^{-1}$.

8. The burner module according to claim 1, wherein the plurality of apertures are arranged in at least one symmetrical array on the planar face.

9. The burner module according to claim 1, wherein the burner module is resistant to thermal shock.

10. The burner module according to claim 1, wherein the body is monolithic.

11. A soot deposition system, the soot deposition system comprising:
 a. a burner assembly comprising a plurality of burner modules arranged in an ordered array, wherein at least one of the burner modules comprises:
  i. a near net shape body, the near net shape body comprising a photo-cured polymer that is stable at temperatures greater than or equal to about 200 degrees Celsius and the photo-cured polymer comprises an acrylate or an epoxy resin;
  ii. a plurality of inlets disposed on a base of the near net shape body, the plurality of inlets comprising at least one combustion gas inlet, at least one oxidizer inlet, optionally at least one inert gas inlet, and at least one precursor inlet, wherein the at least one combustion gas inlet provides a combustion gas to the burner module, the at least one oxidizer inlet provides an oxidizing gas to the burner module, the at least one inert gas inlet provides an inert gas to the burner module, and the at least one precursor inlet provides a soot precursor to the burner module; and
  iii. a plurality of apertures located on a planar face of the near net shape body opposite the base, the planar face having a length, wherein each of the plurality of apertures is in fluid communication through a fluid pathway with one of the at least one combustion gas inlet, the at least one oxidizer inlet, the at least one inert gas inlet, and the at least one precursor inlet; wherein the burner module delivers the combustion gas, the oxidizing gas, the soot precursor, and the inert gas through the plurality of apertures to a combustion site in a chemical vapor deposition process to produce a burner flame in a combustion zone proximate to the planar face;
 b. at least one combustion gas source, at least one oxidizing gas source, at least one inert gas source, and at least one precursor source, wherein the at least one combustion gas source is in fluid communication with each of the plurality of burner modules and provides the combustion gas to the burner module, the at least one oxidizing gas source is in fluid communication with each of the plurality of burner modules and provides the oxidizing gas to the burner module, the at least one inert gas inlet is in fluid communication with each of the plurality of burner modules and provides the inert gas to the burner module, and the at least one precursor inlet is in fluid communication with each of the plurality of burner modules and provides the soot precursor to the burner module; and
 c. a receptor, the receptor having a surface onto which soot created by combustion at the combustion site is deposited.

* * * * *